United States Patent
Lin et al.

(10) Patent No.: US 10,343,492 B2
(45) Date of Patent: Jul. 9, 2019

(54) AIR OUTLET ASSEMBLY AND A METHOD TO ASSEMBLE THE SAME

(71) Applicant: Ford Global Technologies LLC, Dearborn, MI (US)

(72) Inventors: Ryan Lin, Nanjing (CN); Denis Gerard O'Shannessy, Melbourne (AU); Vincent Yin, Nanjing (CN)

(73) Assignee: Ford Global Technologies LLC, Dearborn, MI (US)

( * ) Notice: Subject to any disclaimer, the term of this patent is extended or adjusted under 35 U.S.C. 154(b) by 151 days.

(21) Appl. No.: 15/661,636

(22) Filed: Jul. 27, 2017

(65) Prior Publication Data

US 2018/0037092 A1   Feb. 8, 2018

(30) Foreign Application Priority Data

Aug. 2, 2016  (CN) .......................... 2016 1 0624242

(51) Int. Cl.
   *B60H 1/34*   (2006.01)

(52) U.S. Cl.
   CPC ......... *B60H 1/3428* (2013.01); *B60H 1/3421* (2013.01); *B60H 2001/3471* (2013.01); *B60H 2001/3492* (2013.01)

(58) Field of Classification Search
   CPC ................ B60H 1/3428; B60H 1/3421; B60H 2001/3471; B60H 2001/3492
   USPC .................................................. 454/154–155
   See application file for complete search history.

(56) References Cited

U.S. PATENT DOCUMENTS

| | | |
|---|---|---|
| 3,552,295 A | 1/1971 | Armstrong |
| 3,861,281 A | 1/1975 | Godwin |
| 4,043,258 A * | 8/1977 | Zitko .................. B60H 1/3428 137/601.06 |
| 5,520,579 A | 5/1996 | Saida |
| 5,690,550 A | 11/1997 | Mikowski |
| 5,766,070 A | 6/1998 | Schwarz |
| 6,254,475 B1 | 7/2001 | Danieau et al. |
| 2003/0050001 A1 * | 3/2003 | Kamio ................... B60H 1/345 454/155 |
| 2006/0172679 A1 | 8/2006 | Gehring et al. |

* cited by examiner

*Primary Examiner* — Helena Kosanovic
(74) *Attorney, Agent, or Firm* — Vichit Chea; Kolitch Romano LLP

(57) ABSTRACT

An air outlet assembly comprises an air housing for air flowing through; a retainer connected to the air housing; a plurality of vanes disposed on the retainer, spaced apart each other and rotatably connected to the retainer; and a sliding link. The sliding link is disposed on an inner surface of the air housing, adjacent to the retainer, coupled with each of the vanes and configured to be slidable on the inner surface so as to orient each of the vanes relative to the air housing.

15 Claims, 5 Drawing Sheets

AIR OUTLET ASSEMBLY AND A METHOD TO ASSEMBLE THE SAME

RELATED APPLICATION

This application claims the benefit of Chinese Patent Application No.: CN 201610624242.7 filed on Aug. 2, 2016, the entire contents thereof being incorporated herein by reference.

FIELD

The present application relates an air outlet assembly and a method to assembly the air outlet assembly, in particular relates to a linkage structure connecting vanes in the air outlet assembly.

BACKGROUND

When an air conditioner in a vehicle is operating, a user may adjust the vanes in an air outlet assembly to direct an airflow toward to a desired direction. Conventional technologies usually employ a linkage structure to move vanes to change their direction. However, the linkage structure is visible through the gap of the vanes, which affects the appearance of the air outlet assembly and can obstruct the airflow. For example, a ventilation louver assembly or the air outlet assembly disclosed in the U.S. Pat. No. 5,520,579A comprises a lever connecting with the vanes to selectively direct an airflow from a vent. The lever pivotally connects at least one of vanes to concurrently move all the vanes to adjust their orientation. As the lever is disposed at the gaps among the vanes, an air flow area is reduced and the appearance of the air outlet assembly is adversely affected.

SUMMARY

According to one aspect of the present disclosure, an air outlet assembly is provided. The assembly comprises an air housing for air flowing through; a retainer connected to the air housing; a plurality of vanes disposed on the retainer, and a sliding link. The plurality of vanes is spaced apart each other and rotatably connected to the retainer. The sliding link is disposed on an inner surface of the air housing, coupled with each of the vanes and configured to be capable of sliding on the inner surface so as to orient each of the vanes relative to the air housing.

In one embodiment, the sliding link is disposed adjacent to the retainer and includes a plurality of slots to receive a plurality of coupling parts connected to the plurality of vanes, respectively.

In another embodiment, each slot of the sliding link is enclosed by two linear sidewalls opposite each other and two end walls, and the corresponding coupling part is moveable along the linear sidewalls.

In another embodiment, the coupling parts of the air outlet are connecting rods.

In another embodiment, the air outlet assembly further comprises a groove formed on the inner surface of the air housing. The groove is configured to receive the sliding link and enable the sliding link to slide on the inner surface of the housing along a length of the groove.

In another embodiment, at least one edge of the retainer forms a sidewall of the groove for sliding of the sliding link.

In another embodiment, an outer surface of the sliding link and an adjacent surface of the air housing are substantially at the same plane.

In another embodiment, the vanes are separately connected to at least one side of the retainer along a first line and the groove extends along a second line parallel to the first line.

In another embodiment, the first line of the air outlet assembly is a straight line, and the slots on the sliding link are extending away to the second line with the same angle.

In another embodiment, the first line of the air outlet assembly is an arc of a circle, and slots at an upper portion of the sliding link have an angle to the second line less than an angle of the slots at a lower portion of the sliding link to the second line.

According to another aspect of the present disclosure, an air outlet assembly comprises an air housing for air flowing through; a vane assembly, and a sliding link. The vane assembly includes a retainer, a plurality of vanes coupled to the retainer, and each vane is spaced apart from each other and rotatable along an axis substantially perpendicular to a surface of the retainer. The vane assembly is disposed in a front end portion of the air housing. The sliding link is disposed on an inner surface of the air housing and adjacent to the retainer, includes a plurality of slots to receive coupling parts connected to the vanes respectively, and is moveable on the inner surface of the air housing.

In one embodiment, the sliding link is movable in a groove formed by sidewalls of the air housing and an edge of the retainer; an outer surface of the sliding link and an adjacent surface of the air housing are substantially at the same plane.

In another embodiment, each slot on the sliding link forms an angle with a side of the retainer, and the angle is configured to rotate a corresponding vane in a predetermined degree.

According to another aspect, a method is provided to assemble an air outlet system. The method comprises connecting an air housing to an air duct; placing a sliding link onto an inner surface of the air housing so that the sliding link is moveable along a length of the inner surface; placing a vane assembly into the air housing adjacent to the sliding link; and coupling a plurality of the vanes with the sliding link by inserting coupling parts of the vanes into the plurality of slots the sliding link, respectively.

In one embodiment, the vane assembly includes a retainer to connect the plurality of vanes, and each vane is spaced apart from each other and pivotally connected to the retainer around its connection point, respectively. The sliding link may be disposed adjacent to the retainer, and the movement of the sliding link rotates each vane.

In another embodiment, the retainer and inner walls of the air housing forms a groove and the sliding link is moveable in the groove.

In another embodiment, an outer surface of the sliding link is aligned with an adjacent inner surface of the air housing.

The air outlet assemblies of the present disclosure are advantageous in providing unblocked airflow and improving an appearance of the air outlet assemblies. For example, the sliding link and sliding groove are concealed and not visible from the gap of the vane of the air outlet and thus the air outlet assembly has better appearance. Further, the sliding linkage is not in the airflow path so as to reduce the resistance to the air flow passing the air outlet while capable of adjusting the orientation of the vane.

BRIEF DESCRIPTION OF THE DRAWINGS

Example embodiments will be more clearly understood from the following brief description taken in conjunction with the accompanying drawings. The accompanying drawings represent non-limiting, example embodiments as described herein.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

The disclosed air outlet assemblies will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various air outlet assemblies are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Figure 1:
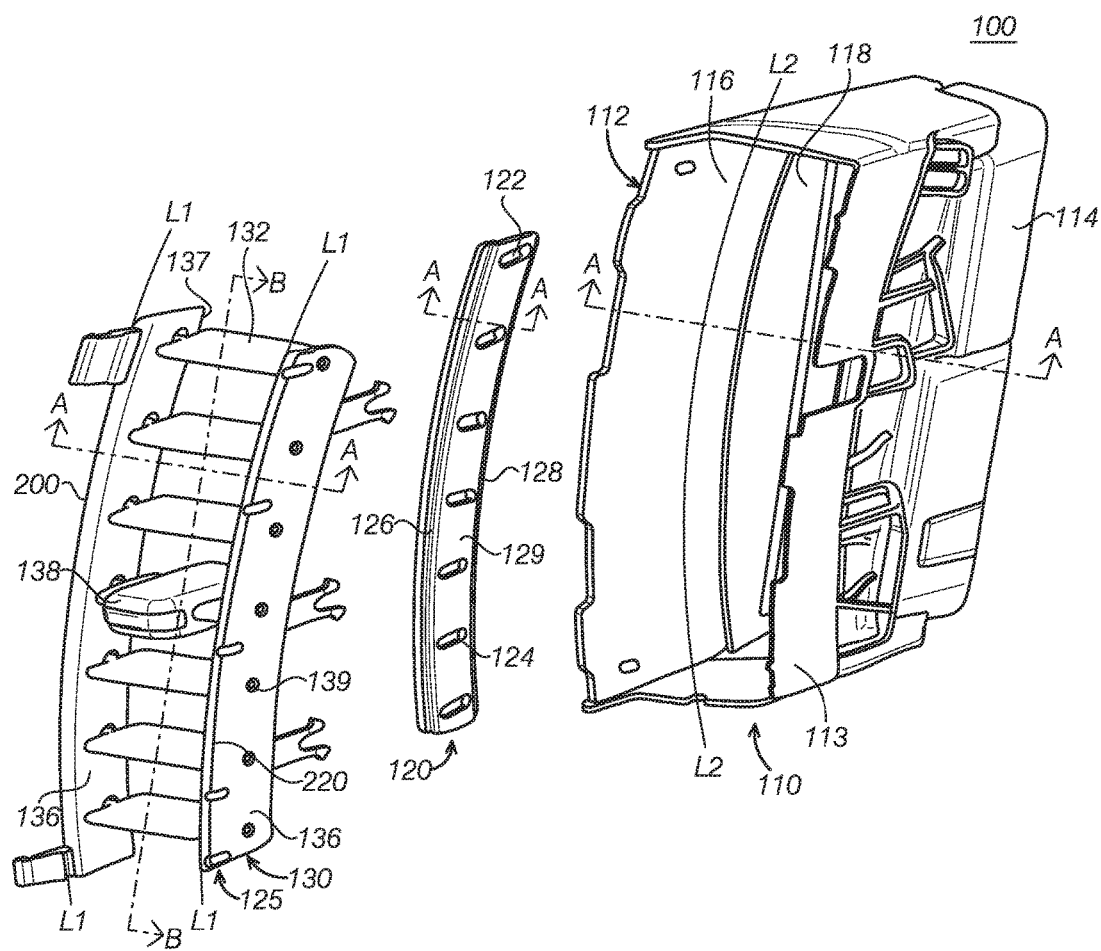
FIG. 1 is an exploded perspective view of an air outlet assembly according to one embodiment of the present disclosure.

FIG. 1 is an exploded perspective view of an air outlet assembly 100 according to one embodiment of the present disclosure. The air outlet assembly 100 comprises an air housing 110, a sliding link 120 and a vane assembly 130. An end 114 of the air housing 110 is connected with an air conditioning (AC) system such as a vehicle AC or an AC in a room. The air housing 100 has an inner wall 112. The air processed (e.g., cooled or heated) by the AC system flows through a space formed by the inner wall 112 into an interior of the vehicle or the room. The housing 110 may be configured as any suitable shapes, such as circular, triangle, or polygon depending on needs. In one embodiment, the air housing 110 may have a cross section with a quadrilateral shape. The inner wall 112 includes four inner walls with two walls opposite each other. At least one inner wall 112 includes a groove 116, which may be a depressed groove or a protruded groove. In the depicted embodiment., the groove 116 is concaved from a surface the inner wall 112 to provide a rail for the sliding movement of the sliding link 120 in the groove 116 in a designated direction such as a length direction. The groove 116 is longer than the sliding link 120. The length of the groove defines a range for sliding movement of the sliding link 120.

Figure 2:
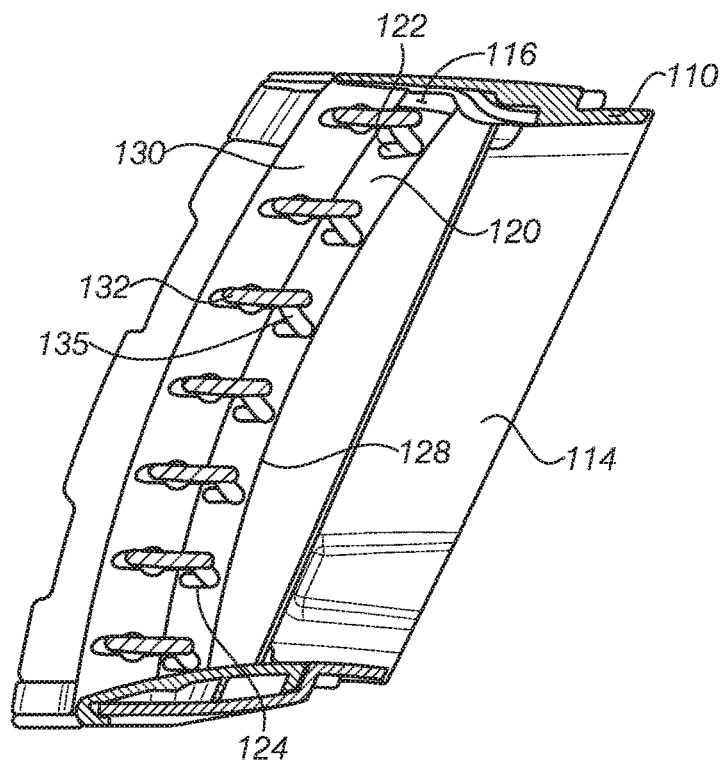
FIG. 2 is a partial perspective view of the air outlet assembly in FIG. 1 at an assembled position.
Figure 3:
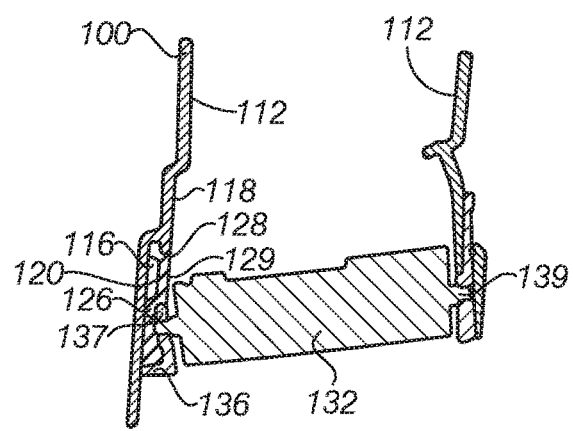
FIG. 3 is a cross-sectional view along A-A line in FIG. 1.

Referring to FIGS. 2 and 3. FIG. 2 is a partial perspective view of the air outlet assembly 100 at an assembled position and shows a projection of the vane assembly 130 on the inner wall 112. FIG. 3 is a cross section view of the air outlet assembly along A-A line in FIG. 1. In one embodiment as shown in FIGS. 2 and 3, the sliding link 120 is disposed in the groove 116, and one side 128 of the sliding link 120 fits with the groove 116 so that an outer surface 129 of the outer wall of the sliding link 120 and an outer surface 118 of an adjacent inner wall 112 of the housing 110 are substantially at a same plane at the assembled position. That is, the outer surface 129 of the outer wall of the sliding link 120 is aligned with the outer surface 118 of an adjacent inner wall 112 of the housing 110. With the integrated and smooth connecting structure with the inner wall 113, the sliding link 120 is concealed in the housing and cannot be noticed as a separate part when viewed from an opening of the housing no matter how the sliding link is moved.

Continuing with FIGS. 1, 2, and 3, the vane assembly 130 includes a retainer 136 and a plurality of vanes 132 connected to the retainer 136. The vane assembly 130 may be positioned at an end 113 of the housing 110 that faces a user. The retainer 136 is connected to the housing 110. The retainer 136 may be an integrated structure surrounding a perimeter of the housing, or may be multiple pieces. In the depicted embodiment., the retainer 136 includes two parallel retainers. The vanes 132 are spaced apart and pivotally connecting with the retainer 136, respectively. The vanes 132 and the retainer 136 collectively form an outer profile of the vane assembly 130. Referring to FIG. 1, in some embodiments, the vanes 132 are separately connected to at least one side of the retainer 136 along a first line L1 that is parallel to an outer edge 220 of the retainer. The groove 116 extends along a second line L2 substantially parallel to the first line L1.

Figure 5:
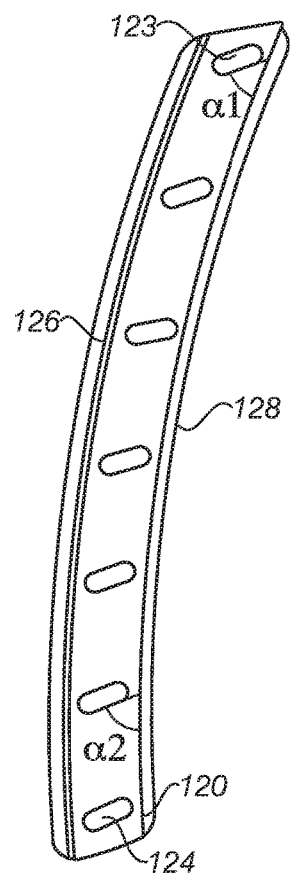
FIG. 5 schematically illustrate the sliding link of the air outlet assembly in FIG. 1.

Referring to FIGS. 1 and 2, the slide link 120 has a plurality of slots 122, and each of the plurality of vanes 132 is connected to the corresponding slot 122 on the slide link 120. With further reference to FIG. 5, the slot 122 has an angle α relative to the side 128 of the retainer 136. The angle α enables the corresponding vane to rotate in a designated range. For example, the vane may be rotated between positions of 60° upward and 60° downward to direct the airflow. Preferably, the rotation may be in a range of upward 30-50° and downward 30-50° to direct the airflow. It should be understood that the angle of the slot 122 may be defined as an angle with the first line L1 or the second line L2. In one embodiment, the first line is a curve of a part of a circle, each slot 122 on the slide link 120 may an angle different from an angle of other vanes. In another embodiment, a slot 122 or a plurality of slots positioned near a top portion or at an upper portion of the sliding link 120 may have a first angle α1, and the slot 122 positioned near a bottom portion or at lower portion of the slide link 120 may have a second angle α2. The first angle α1 may be less than the second α2.

In one embodiment, the slot 122 on the sliding link 120 is formed with two opposite linear walls and two end walls. Referring FIGS. 2 and 3, the vane 132 is linearly slidable along the linear side walls. In some embodiments, the vane 132 has a connecting portion, such as, the connecting rod 135 or other forms of link or joint arm. Each of the vanes 132 is connected to the slot 122 via each of its own connecting rod 135. The connecting rod 135 may slide along the linear sidewalls of the slot 122 to drive the vane 132 connected with it to rotate around a pivot 139 that is pivotally connected to the retainer 136. While driving vane 132 to rotate, the connecting rod 135 not only slides in the slot 122 on the sliding link 120, but also drives the sliding link 120 to move up and down along the groove 116. Because all vanes are coupled with the sliding link 120, the movement of any vane 132 drives the sliding link 120 up and down, and thus other vanes 132 can be moved synchronically and rotated around its pivot 139.

As shown in FIG. 3, the retainer 136 and the inner wall 112 of the housing together form the groove 116 to receive the sliding link 120 and enable the sliding link 120 to slide up and down. At least one side wall 137 of the retainer 136 forms a side wall of the groove 116. This configuration is advantageous in assembling the air outlet assembly. For example, one side 128 of the sliding link 120 may be connected to the groove 116 first, and the retainer 136 is assembled next. At least one side 137 of the retainer 136 is connected to another side of the sliding link 120 to restrain the sliding link in the groove 116. In this way, it is not necessary to insert the sliding link after the groove is formed as the conventional approach. Since the sliding link 120 will be connected to the plurality of vanes 132, the conventional approach of inserting a sliding link into the groove from a top of housing is difficult to complete after the sliding link 120 and the plurality of vanes 132 are connected. The air outlet assembly of the present disclosure allows the assembling of the air outlet, the sliding link and the retainer in that order and thus making the assembling process easier.

In depicted embodiment., the air outlet assembly 100 includes one sliding link 120 disposed on one inner side wall of the housing 110. It should be understood that the air outlet assembly 100 may include two sliding links disposed on the two opposite inner side walls of the housing.

Figure 4A:
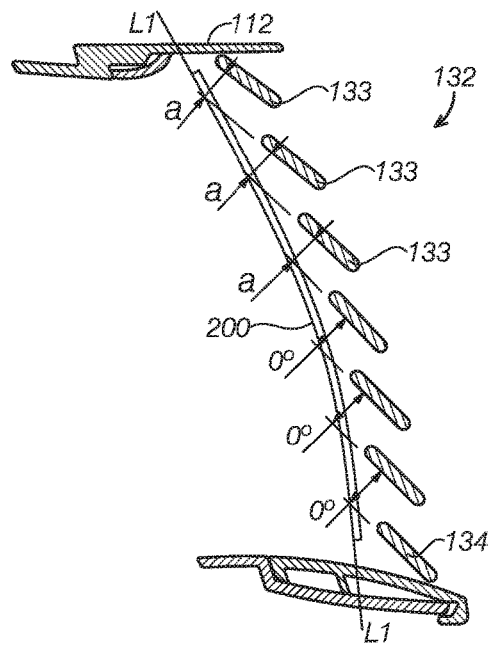
FIG. 4A schematically depicts a working condition of the air outlet assembly in FIG. 1, illustrating the vanes at the positions to direct airflow downward.
Figure 4B:
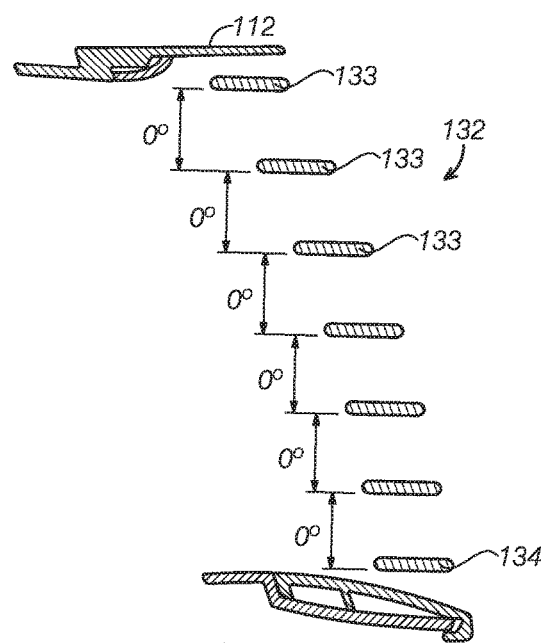
FIG. 4B schematically depicts a working condition of the air outlet assembly in FIG. 1, illustrating the vanes at the positions to direct airflow horizontally.
Figure 4C:
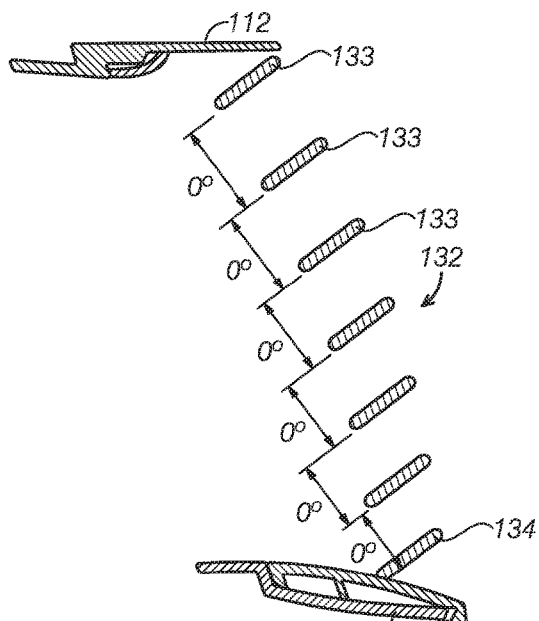
FIG. 4C schematically depicts a working condition of the air outlet assembly in FIG. 1, illustrating the vanes at the positions to direct airflow upward.

Now referring to FIGS. 4A, 4B, and 4C, FIGS. 4A-4C are cross-sectional view of the air outlet assembly 100 along line B-B in FIG. 1, schematically illustrating the vanes 132 of the air outlet assembly at a downward position to direct airflow down, a leveled position to direct a horizontal airflow, and an upward position to direct airflow up, respectively. To simplify illustration, a portion of the vane and the housing are shown. In the embodiments depicted in FIGS. 4A, 4B, and 4C, a plurality of vanes 132 are spaced apart along the retainer 136 and along the curved line 200. The curve may be a portion of a circle. The curved line 200 is parallel with the L1 as shown in FIG. 1. The sliding link 120 has a curve outline substantially parallel with the curved line 200. In other words, the sides 128 and 126 of the sliding link 120 have curved lines substantially parallel the curved line 200 or parallel the first line L1 or second line L2 as shown in FIG. 5. In addition, the groove 116 disposed on the inner wall 112 of the air housing also has a curved side parallel with the curve 200. Movement of the sliding link 120 drives the vanes 132 synchronically to direct the airflow downward, upward of a horizontal direction.

The vane 132 includes vanes 133 positioned at an upper portion and vanes 134 positioned at a lower portion of the air outlet. To achieve smooth movement of the sliding link 120 and concurrent movement of the plurality of vanes, the angle α of the multiple slot 122 on the sliding link 120 may be configured not to be parallel each other. In the embodiment as shown in FIG. 5, the slot 122 includes a slot 123 at the upper portion and a slot 124 at the lower portion of the sliding link 120. The plurality of slots of the sliding link 120 may have different angles. The slot 123 at upper portion has an angle α1 less than an angle α2 of the slot 124 at the lower portion. The angle can be an angle α between the slot and the curved line 200, or an angle can be an angle between the slot and the corresponding radius line.

Figure 6:
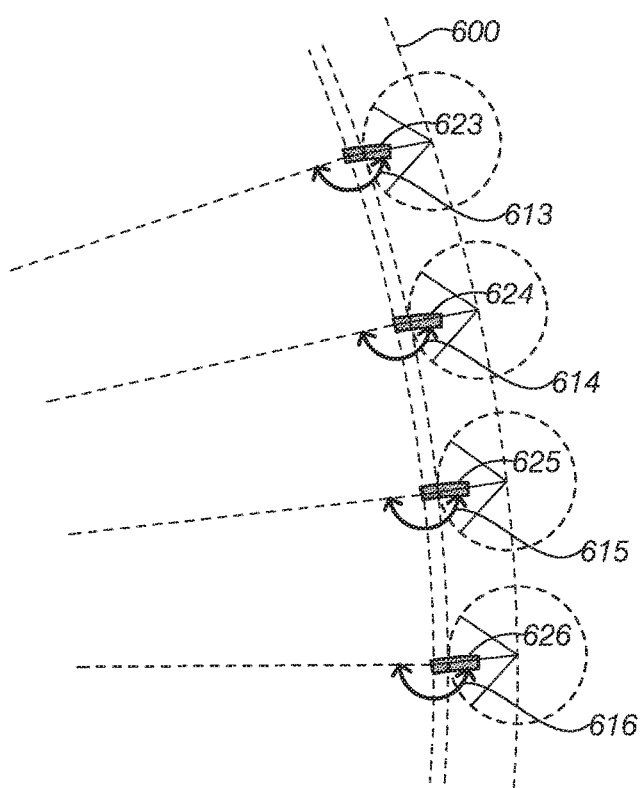
FIG. 6 schematically illustrates slots in the sliding link of the air outlet assembly in FIG. 1.

An example of the change of angles the slot with the radius is illustrated in an embodiment shown in FIG. 6. The sliding link 600 has four slots 623, 624, 625, and 626 corresponding to four adjacent vanes, respectively. The angle of each slot with corresponding radius is 613, 614, 615, and 616, respectively. In the depicted embodiment, to enable smooth movement of each vane and achieve desired downward air flow from the vanes at the upper portion, the angle of each slot with corresponding radius 613, 614, 615, and 616 may be configured to increase gradually, such as increase with an increment of 7°, for example. That is, the angle 614 is 7° greater than the angle 613, the angle 615 is 7° greater than the angle 614, and the angle 616 is 7° greater than the angle 615. The angle of the slot may increase in another increment, such as in a range of 3° to 10° depending on configuration of the air outlet assembly. The different angles for the slots at the upper portion and the slots at the lower portion of the air outlet enables each vane to move smoothly and the vanes at the upper portion of the air outlet also have desired airflow when the vanes are adjusted to direct the airflow downward. FIG. 6 is only an example embodiment. In other embodiments, the air outlet assembly may have a plurality of vanes and slots disposed on the sliding link corresponding the vanes, such as more than four vanes, Since the vanes 132 are spaced apart and disposed along the curved line 200, the vanes 133 at the upper portion of the air outlet may be configured to have an air directing angle greater than an air directing angle of the vanes 134 at lower portion to prevent occurrence of reduced airflow from the vanes 133 at the upper portion when directing airflow downward due to the blockage of the vanes at the lower portion. In one embodiment, the vanes 133 at the upper portion may be configured to have a rotation angle less than the rotation angle of the vanes 134 at lower portion. In other words, the two vanes at the upper portion have an angle a. In one embodiment, the angle a may be 3°. or may be between 1° to 7° based on the needs, as shown in FIG. 4A. FIG. 4A also shows that the two vanes at the lower portion are substantially parallel, that the angle a is 0°. When directing an airflow in a horizontal direction or upward, all of the vanes 132 of the air outlet may be configured to have a same angle, as shown in FIGS. 4B and 4C.

In addition, adjustment on the connection position of each vane with its connecting rod can further coordinate its connection with the sliding link 120 and sliding movement of the sliding link along the groove.

Figure 7:
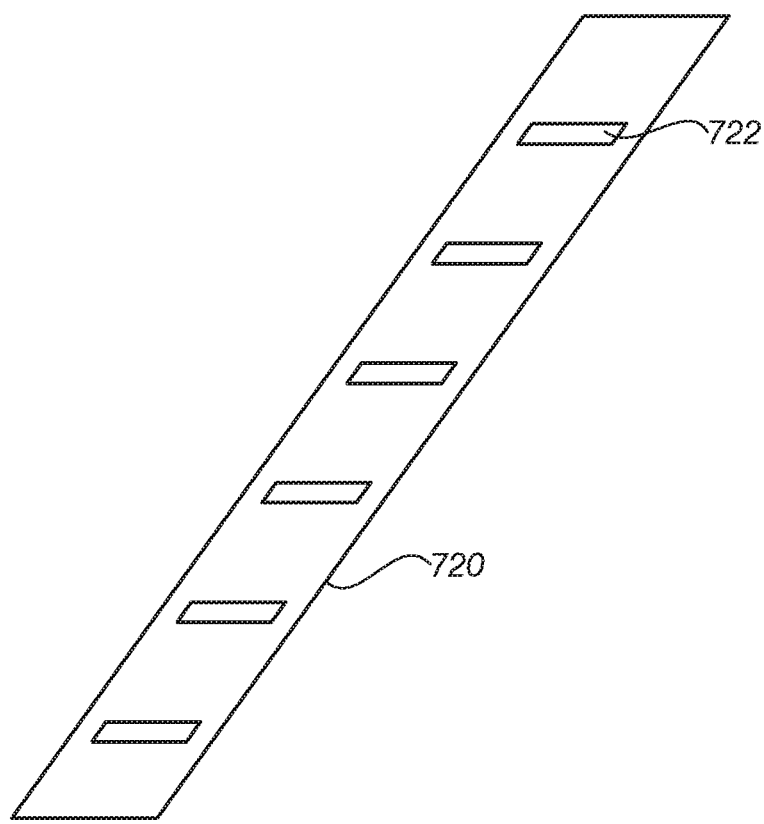
FIG. 7 schematically illustrate a sliding link according to another embodiment of the present disclosure.

Referring to FIG. 7, in one embodiment, a sliding link 720 has a linear configuration. Accordingly, the vanes on the air outlet retainer is spaced apart along with a straight line, and the corresponding groove has a linear configuration. In the depicted embodiment, the sliding link 722 has a plurality of slots 722, and extends parallelly each other. The plurality of slots 722 are connected with the corresponding vanes. As the sliding link 720 moves up and down, the plurality of vanes also move synchronically up and down and result in an airflow with consistent air flow direction.

The air outlet assembly of the present disclosure provides a sliding link on a groove of the inner wall so that the linkage structure is not visible to provide better appearance. Further, the resistance to the airflow is reduced to improve the flowing efficiency while the synchronized rotation of each vane is maintained.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions.

It will be appreciated that the configurations and routines disclosed herein are exemplary in nature, and that these specific embodiments are not to be considered in a limiting sense, because numerous variations are possible. The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

The invention claimed is:

1. An air outlet assembly, comprising:
an air housing for air flowing through;
a retainer connected to the air housing;
a plurality of vanes disposed on the retainer, spaced apart each other along a lengthwise direction and rotatably connected to the retainer;
a groove formed on an inner surface of the air housing; and
a sliding link disposed on the groove, wherein the sliding link is coupled with each of the vanes and configured to be slidable on the inner surface so as to orient each of the vanes relative to the air housing, and
wherein the groove is configured to receive the sliding link and is longer than the sliding link.

2. The air outlet assembly of claim 1, wherein the sliding link is disposed adjacent to the retainer and includes a plurality of slots to receive coupling parts connected to the plurality of vanes, respectively.

3. The air outlet assembly of claim 2, wherein each slot is enclosed by two linear sidewalls opposite each other and two end walls, and wherein the corresponding coupling part is moveable along the linear sidewalls.

4. The air outlet assembly of claim 2, wherein the coupling parts are connecting rods.

5. The air outlet assembly of claim 1, wherein at least one edge of the retainer forms a sidewall of the groove.

6. The air outlet assembly of claim 2, wherein an outer surface of the sliding link and an adjacent surface of the inner wall of the air housing are substantially at a same plane.

7. The air outlet assembly of claim 2, wherein the vanes are separately connected to at least one side of the retainer along a first line and the groove extends along a second line parallel to the first line.

8. The air outlet assembly of claim 7, wherein the first line is a straight line, and the slots extends to the second line with same angle.

9. The air outlet assembly of claim 7, wherein the first line is an arc of a circle, and a slot at the upper portion of the sliding link has an angle to the second line less than an angle that a slot at a lower portion of the sliding link has with the second line.

10. An air outlet assembly, comprising:
an air housing for passing through air flow;
a vane assembly including:
a retainer;
a plurality of vanes coupled to the retainer, wherein each vane is spaced apart each other and rotatable along a pivot substantially perpendicular to a surface of the retainer, wherein the vane assembly is disposed in a front end portion of the air housing; and
a sliding link disposed on an inner surface of the air housing and adjacent to the retainer, wherein the sliding link includes a plurality of slots to receive coupling parts connected to the vanes respectively,
wherein the sliding link is moveable on the inner surface of the air housing, and
wherein an outer surface of the sliding link and an adjacent surface of the air housing are substantially at the same plane.

11. The air outlet assembly of claim 10, wherein the sliding link is movable in a groove formed by sidewalls of the air housing and an edge of the retainer.

12. The air outlet assembly of claim 10, wherein each slot has an angle to a side of the retainer, and the angle is configured to enable rotation of a corresponding vane in a predetermined degree.

13. A method to assemble an air outlet assembly, comprising:
connecting an air housing to an air duct;
placing a sliding link onto an inner surface of the air housing so that the sliding link is moveable along a length of the inner surface;
placing a vane assembly into the air housing adjacent to the sliding link; and
coupling a plurality of the vanes with the sliding link by inserting coupling parts connected to the vanes into a plurality of slots of the sliding link, respectively,
wherein placing the sliding link onto the inner surface of the air housing includes aligning an outer surface of the sliding link with an adjacent surface of the air housing.

14. The method of claim 13, wherein the vane assembly including a retainer to connect the plurality of vanes, wherein each vane is spaced apart from each other and pivotally connected to the retainers via a pivot, respectively, and wherein the sliding link is disposed adjacent to the retainer, and wherein movement of the sliding link rotates the plurality of vanes.

15. The method of claim 13, wherein the retainer and an inner wall of the air housing forms a groove and the sliding link is moveable in the groove.

* * * * *